Dec. 10, 1935.    D. E. CHILD ET AL    2,024,025
CLAY WORKING
Filed April 25, 1934
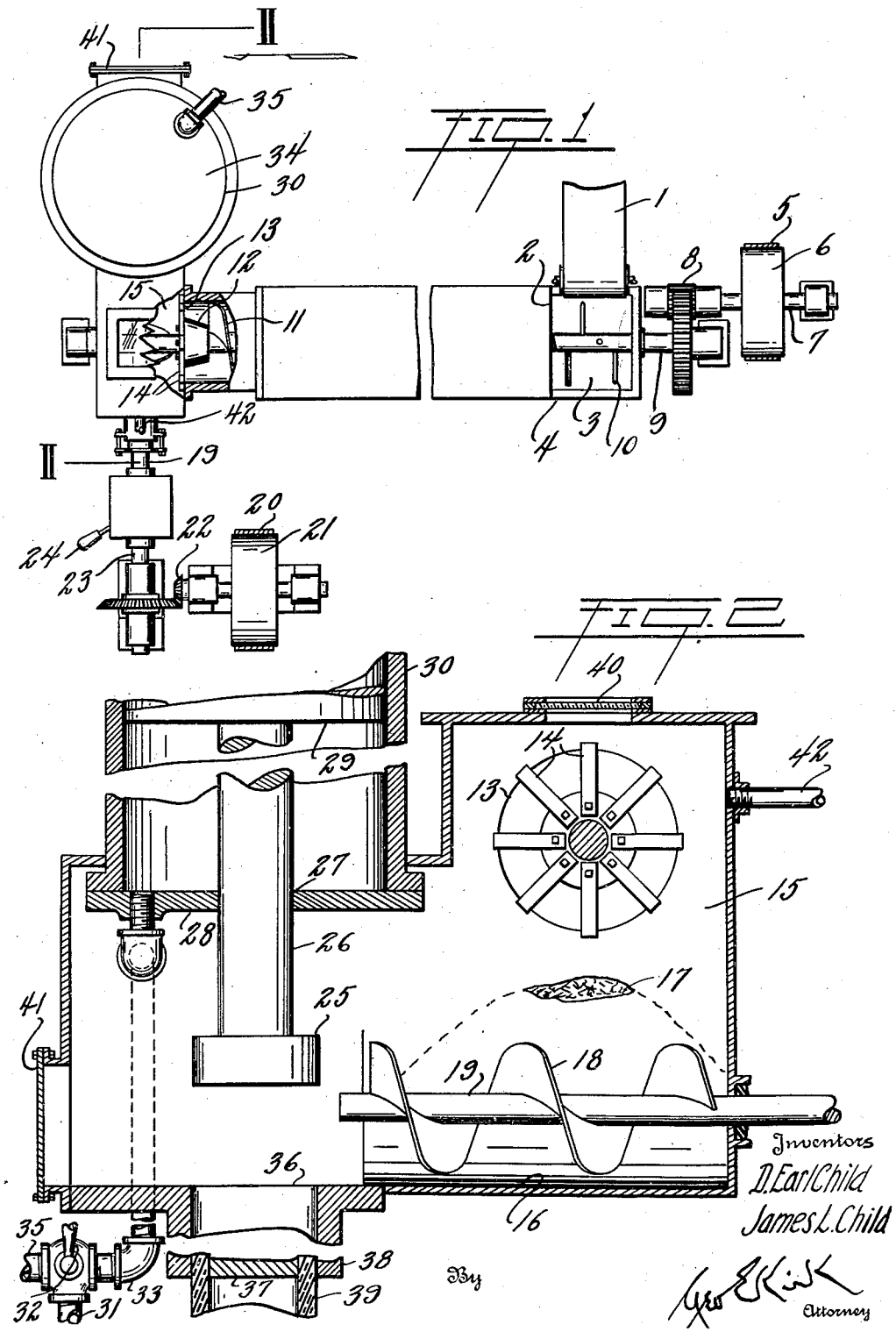
Inventors
D. Earl Child
James L. Child
By
Geo E Kirk
Attorney Patented Dec. 10, 1935

2,024,025

UNITED STATES PATENT OFFICE 2,024,025

CLAY WORKING

D. Earl Child and James Leo Child, Findlay, Ohio, assignors to The Hancock Brick & Tile Company, Findlay, Ohio, a corporation of Ohio Application April 25, 1934, Serial No. 722,388

4 Claims. (Cl. 25—11)

This invention relates to molding by supplying material for compacting into a form.

This invention has utility when incorporated in the manufacture of clay or other plastic articles from batches.

Referring to the drawing:

Fig. 1 is a plan view, with parts broken away, of an embodiment of the invention; and Fig. 2 is a section on the line II—II, Fig. 1.

Conveyor 1 is shown for supplying clay to one end 2 of a pug mill having opening 3 through top 4 of said pug mill. Belt 5 may continuously rotate pulley 6 on shaft 7 having gear connection 8 with shaft 9 extending into the housing 4. On this shaft 9 are pug knives 10 and auger 11 effective to temper and force a valve-forming solid mass of clay over cone 12 and through annular opening 13. Fixed to rotate with the shaft 9 is annular series of knives 14 mounted at the cone 12 in chamber 15. The spill from this pug mill is thereby comminuted or shaved off into fine particles to fall toward bottom 16 of the chamber 15 and there repose as a pile 17 over scroll 18 as a conveyor mounted on shaft 19. Continuously driving belt 20 is effective through pulley 21, gearing 22, to drive shaft 23. Control handle 24 may effect intermittent clutching in of the shaft section 19, thus allowing for manual control in the operation of the conveyor 18 at the interval when plunger 25 is elevated in the chamber 15. This plunger 25 has therefrom stem 26 through packed joint 27 and cylinder head 28 to piston 29 in cylinder 30.

Power supply 31 for steam may have flow thereof controlled by valve 32 for pressure to flow by line 33 into the lower portion of the cylinder 30 to effect lifting and holding of the plunger 25. At this position of the valve 32 pressure fluid from upper head 34 of the cylinder 30 may flow by line 35 to the valve 32 and be exhausted from the back portion thereof. Reverse of the handle from toward the pipe 33 toward the pipe 35 connects the pipe 33 for exhausting back through the valve 32 while pressure fluid from the line 31 flows by the line 35 to the side of the piston 29 away from the plunger, thus to effect as a power stroke thrusting of the plunger 25 through opening 36 as an extruder from this transfer chamber 15, thereby causing the sub-atmospheric, treated, comminuted material to pass through a die having central portion 37 and ring 38 thereabout.

Tubular product 39 is thus extruded to be received on a pallet and severed in desired lengths. By this disclosure, any length may be produced, a single length formed by a plurality of full length or fractional strokes of the plunger, the extrusion being a continuous discharge, intermittently advanced thereby maintaining a valve-forming mass in the die.

The invention herein is for use in the production of structural clay shapes but more particularly adapted to produce large tile.

In the operation hereunder, this clay of a suitable character for burning and which may be used for tile suitable for drainage, is herein formed in the treatment into lengths of tile even 36 inches and upward in diameter with walls 3 or more inches in thickness. There is thus produced a substantial clay product which may be tempered and fired or burned in the hardening treatment to render such suitable for culvert or other work requiring a degree of strength. Due to this vacuum transfer or sub-atmospheric inter-delivery device between the extruder and pug mill, there is a character of clay delivered to the extruder which is free from entrained gaseous matter, thus defeating at the treating, hardening, firing or burning stages, weakening action from entrained gaseous material expansion.

This transfer vacuum chamber is shown provided with window 40 above the comminuter and location for the pile 17, so that check of the performance may be had by the operator. Clean-out 41, adjacent the port or opening 36, provides accessible region in instances to remove material between periods of operation in the machine. Thus, the material may be properly conditioned for delivery to the forming apparatus and if the accumulation in the chamber 15 exceeds the delivery rate, then the batches are fed from the bottom of the pile 17 in such quantity as may be necessary for a charge as moved from the pile by the conveyor 18. The conveyor 18 is then shut off and the plunger operated for its cycle in descending into the port 36 to effect an extrusion and then to move clear of the port for allowing a re-operation of the scroll.

Pipe connection 42 to the chamber 15 is effective in exhausting air from this chamber 15 and in practice is so effective that approximately 27 inches of mercury is the measure of the vacuum obtained.

The operation may be timed so that the pile 17 is delivered as a whole to the former as is each succeeding pile or the accumulations in the chamber 15 build up and batch delivery be from the bottom of the pile. In any instance, sufficient time elapses to insure a thorough de-aeration of the clay and the comminuted clay is formed by compression before the plastic mass has any exposure to atmospheric pressure.

What is claimed and it is desired to secure by Letters Patent is:

1. An extruder, a pug mill, and a sub-atmospheric pressure transfer therebetween including a chamber, a comminuter in the chamber for acting upon pug mill discharge into the chamber, a plunger in said chamber intermittently operable for effecting extrusion from the chamber, a charger operative relatively to and independently of the plunger for shifting a charge into alignment with the plunger, and control means for cycle sequence between said charger and plunger.

2. Clay handling apparatus embodying a pug mill having a discharge, clay comminuting means at said discharge, a chamber having a maintained substantial vacuum into which said comminuted clay is discharged to form an accumulation thereof, clay forming means extending from the chamber, and means movable relatively to the comminuting means and forming means for intermittently shifting a charge from the bottom of said accumulation to said forming means.

3. Clay handling apparatus embodying a pug mill having a discharge, clay comminuting means at said discharge, a chamber having a maintained substantial vacuum into which said comminuted clay is discharged to form an accumulation thereof for temporary storage, means intermittently segregating a batch of said clay in the chamber from the bottom of the accumulation, clay forming means extending from the chamber, said intermittent means operable independently of the comminuting means and the forming means, and means forcing said batch from the chamber through said forming means.

4. The method of preparing a blank for hardening treatment in continuous and intermittent stages including continuously pugging a supply of material, comminuting the pugged supply, accumulating a pile of the comminuted supply, subjecting said pile for a period of time to sub-atmospheric pressure, intermittently shifting a batch from the bottom of the pile to form a charge, progressing said charge from the pile while still under sub-atmospheric pressure, and exposing the progressed charge to forming pressure by extrusion.

D. EARL CHILD.
JAMES LEO CHILD.